(12) United States Patent
Summers et al.

(10) Patent No.: US 8,265,229 B2
(45) Date of Patent: Sep. 11, 2012

(54) DIGITAL SUBSCRIBER LINE TESTING TOOL

(75) Inventors: Benjamin A. Summers, Providence, RI (US); James P. Lally, Odenton, MD (US); Charles G. Solley, Glen Burnie, MD (US); Frank A. Kuehn, Long Beach, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 665 days.

(21) Appl. No.: 12/435,109

(22) Filed: May 4, 2009

(65) Prior Publication Data

US 2010/0278313 A1 Nov. 4, 2010

(51) Int. Cl.
*H04M 1/24* (2006.01)
*H04M 3/08* (2006.01)
*H04M 3/22* (2006.01)
(52) U.S. Cl. .................................... 379/1.03; 379/29.09
(58) Field of Classification Search .............. 379/1.03, 379/1.04, 21, 24, 26.01, 28, 29.01, 29.09; 370/241; 375/222, 224
See application file for complete search history.

(56) References Cited

U.S. PATENT DOCUMENTS

| | | | |
|---|---|---|---|
| 2005/0013415 A1* | 1/2005 | Atkinson et al. | 379/21 |
| 2005/0163286 A1* | 7/2005 | Jiang et al. | 379/1.04 |
| 2009/0074153 A1* | 3/2009 | Wu et al. | 379/1.04 |
| 2010/0150318 A1* | 6/2010 | Irenze et al. | 379/21 |

* cited by examiner

*Primary Examiner* — Quoc D Tran

(57) ABSTRACT

A broadband service, such as Digital Subscriber Line (DSL) service, may be tested by a technician installing or performing maintenance on the broadband service. The technician may use the subscriber's computer as a test set, in which the technician may login to a testing service that may test the line using test equipment located externally to the subscriber premise. A test application may receive, from a computing device located at the subscriber premise, a request to test the broadband service at the subscriber premise as part of installation of the broadband service. The test application may initiate a test of the broadband service using test equipment located externally to the subscriber premise. The test may include tests relating at least to the physical layer of the broadband network connection. Results of the test may be transmitted to the subscriber premise.

24 Claims, 8 Drawing Sheets

Telephone Number: [5224207007]
e.g., NNNNNNNNNN or NNN-NNN-NNNN (Submit for Testing)
(Speed Change)

Speed Optimization Results for TN: 5324207007

Test ID: 994166       Submitted: 5/8/2009 8:40:00 AM

Test Type: SPEED_DOWNGRADE     Completed: 5/8/2009 8:41:00 AM

Optimized Speed Setting: ASAM Speed is downgraded to 768K-128K

IMPORTANT: *Service will automatically revert to provisioned speed in 5 minutes.*

DIGITAL SUBSCRIBER LINE TESTING TOOL

BACKGROUND

Digital Subscriber Line (DSL) is a technology for bringing high-bandwidth digital information to homes and businesses over telephone lines. A DSL line can simultaneously carry both data and voice signals. The data portion of the line may be continuously available to the user, making DSL an "always-on" connection. Special digital hardware attached to both ends of the line allows data transmission over the wires at relatively high bandwidths.

DSL is offered to subscribers by DSL providers. DSL providers connect DSL modems, through a digital subscriber line, to a central office. Typically, the distance between the user and the central office must be less than a certain distance, such as about four miles, for the DSL connection to operate properly. At the central office, signals from the DSL subscriber may be packetized and transmitted to a larger network, such as an asynchronous transfer mode (ATM) network that connects to an Internet Service Provider (ISP).

When installing or repairing a DSL connection a technician typically visits the subscriber's premise to test the service. To test the DSL service, the technician may use one or more devices carried by the technician and that the technician plugs into the line. The device(s) may provide information relating to the quality of the connection, such as maximum bit rate, error rate, and noise level of the line. Based on this information, the technician may determine whether the subscriber is experiencing an acceptable level of service.

BRIEF DESCRIPTION OF THE DRAWINGS

FIGS. 6A-6D are diagrams of exemplary graphical user interfaces that may be presented to a technician during testing of DSL service.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may facilitate the efficient and accurate testing of a broadband connection, such as a DSL line, by an installation or repair technician at a subscriber premise. The technician may use the customer's computer as a test set, in which the technician may logon to a testing service that may test the DSL line using testing hardware located externally to the subscriber premise. Test results may be provided to the subscriber premise through a browser-based interface, allowing the test to be performed without modifying the subscriber's computer. Thus, the technician may not need to carry test equipment and the test, when carried out from the subscriber's computer, may demonstrate an end-to-end network connection at the subscriber's computer without needing to install software on the subscriber's computer.

Figure 1:
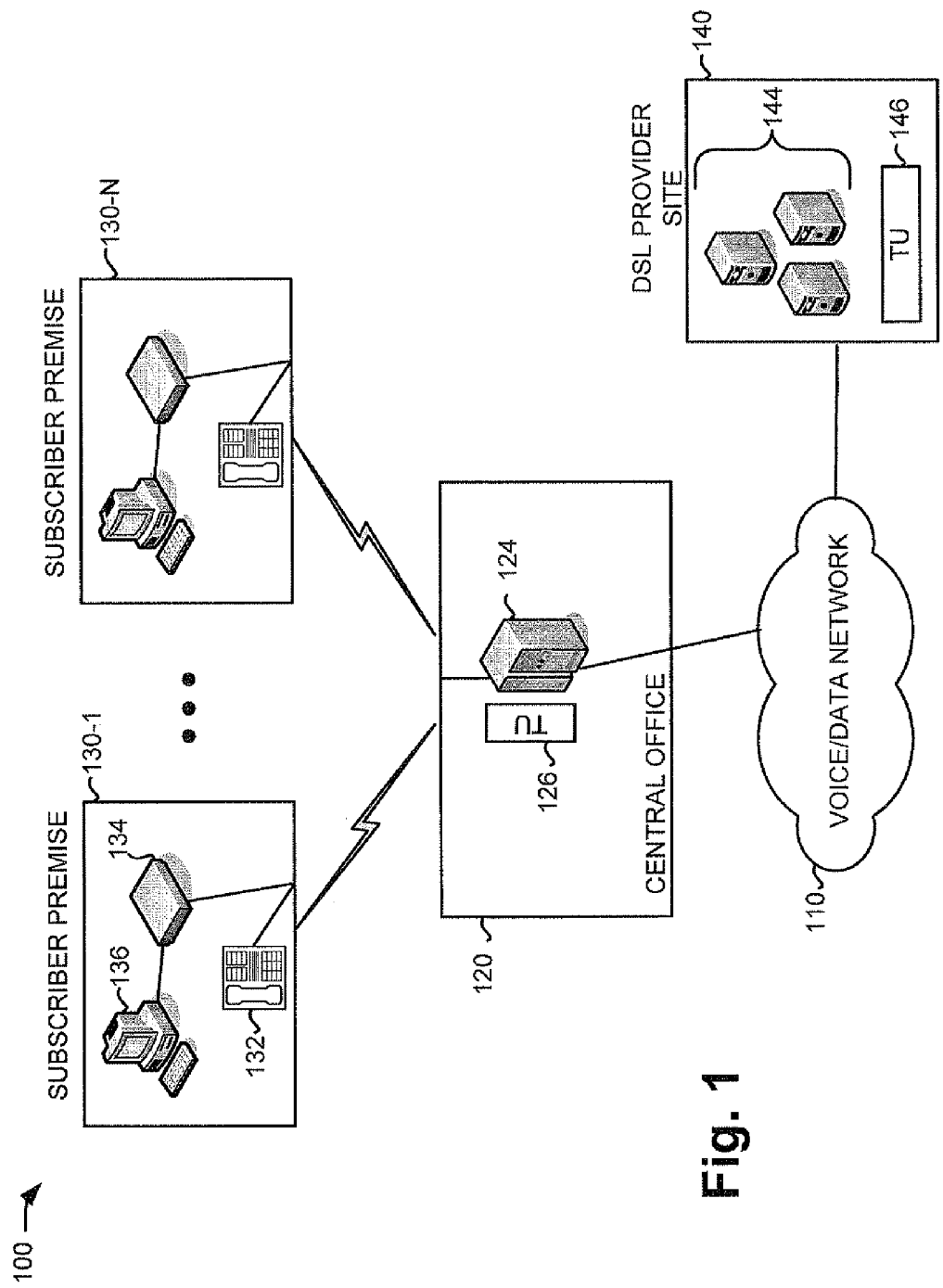
FIG. 1 is a diagram of an exemplary environment in which systems and/or methods described herein may be implemented.

FIG. 1 is a diagram of an exemplary environment 100 in which systems and/or methods described herein may be implemented. As illustrated, environment 100 may include a network 110. A central office 120 may connect to network 110 and to a plurality of subscriber premises 130-1 through 130-N (collectively, subscriber premises 130). A DSL provider site 140 may also connect to network 110.

Network 110 may include a Local Area Network (LAN), a wide area network (WAN), such as a cellular network, a satellite network, a broadcast television based network, the Internet, a private WAN, or a combination of the Internet and a private WAN, that is used to transport data. Network 110 may include a number of separate networks that function to provide services to customer premises 130. In one implementation, network 110 may be a network that provides voice and data services for subscriber premises 130. Network 110 may include a high capacity data backbone associated with the DSL provider. For instance, network 110 may include a circuit-switched telephone network and a packet-based data network. Subscriber premises 130 may be connected, through central office 120, to network 110.

Central office 120 may represent a physical location, generally controlled by the DSL provider, through which subscriber premises 130 connect to network 110. Central office 120 may be located relatively close to subscriber premises 130 (e.g., within three or four miles).

Central office 120 may particularly include a digital subscriber line access multiplexer (DSLAM) 124 and a DSL test unit (TU) 126. DSLAM 124 may connect multiple lines (i.e., lines from multiple subscriber premises 130) to network 110. In general, DSLAM 124 may collect data from a plurality of modem ports and aggregate the voice and data traffic into one complex composite signal via multiplexing. Depending on its device architecture and setup, DSLAM 124 may aggregate DSL lines over Asynchronous Transfer Mode (ATM), frame relay, and/or an Internet Protocol network. The aggregated traffic may then be directed to network 110, possible by transmitting the data through an access network (AN). Although shown located within central office 120, in some implementations, DSLAM 124 may be located at locations external to central office 120.

TU 126 may include one or more devices (test equipment) designed to test the DSL service of a subscriber. TU 126 may particularly include hardware designed to test the telephone line associated with the DSL service. TU 126 may implement many or all of the tests that may be performed by current portable testing devices that are carried by the installation technician into the subscriber premise. The test functions performed by TU 126 may include, for example, determination of a maximum upstream or downstream bit rate, determination of a maximum or average line capacity, determination of a line error rate, and/or determination of a noise on the line. In other implementations, other test functions are possible.

In some implementations, the DSL test functions may be implemented by devices located at locations other than central office 120. For example, testing devices may be located at DSL provider site 140, shown as TU 146 (described in more detail below), or at other locations in environment 100.

Subscriber premise 130 may each represent a subscriber to the DSL service offered by the DSL provider (e.g., via DSL provider site 140). Each subscriber premise 130 may connect to central office 120 through conventional twisted pair cabling. A subscriber premise, such as subscriber premise 130-1, may include, for example, one or more standard telephones 132, a DSL modem 134, and one or more computing devices 136. Telephone 132 may include a conventional analog phone through which a user may place and receive calls. DSL modem 134 may include circuitry to modulate high frequency tones for transmission to DSLAM 124. DSL modem 134 may correspondingly receive and demodulate signals from DSLAM 124. DSL modem 134 may provide a data connection to computing devices 136 via, for example, an Ethernet or Universal Serial Bus (USB) connection. In some implementations, DSL modem 134 may also include an integrated router. In these situations, DSL modem 134, in addition to converting between DSL frequency signals and Ethernet signals, may provide local routing services to computing devices 136.

Computing devices 136 may include computing or communication devices such as personal computers, laptops, Voice over IP (VoIP) phones, or other devices. Multiple computing devices 136 at a single subscriber premise may connect to DSL modem 136, either directly or through a local switching or routing device.

DSL provider site 140 may represent equipment or network control components used by the DSL provider. For instance, DSL provider site 140 may include control or monitoring equipment for multiple central offices 120. As particularly shown in FIG. 1, DSL provider site 140 may include one or more servers 144 and a DSL TU 146. Servers 144 may include computing devices that provide support for a DSL test tool, which will be described in more detail below. Servers 144 may include, for example, web servers that may provide a web interface for the DSL test tool to remote computing devices, such as one of computing devices 136. TU 146 may include one or more devices designed to test the DSL service of a customer. TU 146 may be implemented alternatively or in conjunction with TU 126. For example, in various potential implementations, TU 146 may be used in place of TU 126, TU 146 may not be present and TU 126 may be exclusively used, or TU 126 and 146 may both be used, potentially implementing different and complimentary test functions.

Figure 2:
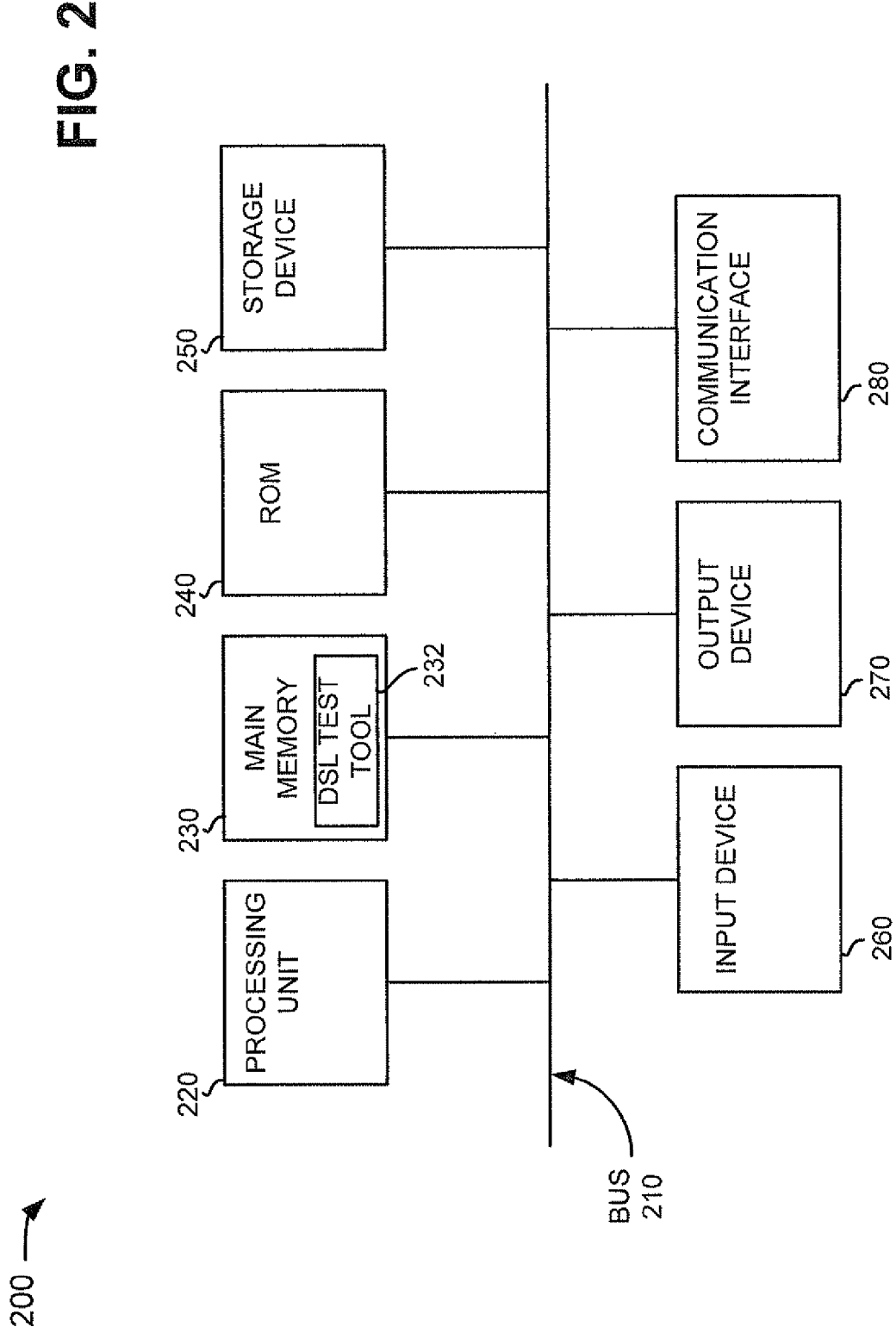
FIG. 2 is a block diagram of an exemplary computing device which may correspond to one or more of the computing devices shown in FIG. 1.

FIG. 2 is a block diagram of an exemplary computing device 200, which may correspond to one or more servers 144 or computing devices 136. As illustrated, device 200 may include a bus 210, a processing unit 220, a main memory 230, a read only memory (ROM) 240, a storage device 250, an input device 260, an output device 270, and a communication interface 280. Bus 210 may include a path that permits communication among the elements of computing device 200.

Processing unit 220 may include one or more processors, microprocessors, or other types of processing devices that may interpret and execute instructions. Main memory 230 may include a random access memory (RAM) or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator to input information to computing device 200, such as a keyboard, a mouse, a pen, a microphone, voice recognition and/or biometric mechanisms, etc. Output device 270 may include a mechanism that outputs information to the operator, including a display, a printer, a speaker, etc. Communication interface 280 may include any transceiver-like mechanism that enables computing device 200 to communicate with other devices and/or systems. For example, communication interface 280 may include mechanisms for communicating with another device or system via a network, such as network 110. In implementations in which computing device 200 represents a server (e.g., one of servers 144), input device 260 and output device 270 may not be used. That is, the server may be a "headless" computing device.

As described herein, computing device 200 may perform certain operations in response to processing unit 220 executing software instructions contained in a computer-readable medium, such as main memory 230. A computer-readable medium may be defined as a physical or logical memory device. A logical memory device may include memory space within a single physical memory device or spread across multiple physical memory devices. The software instructions may be read into main memory 230 from another computer-readable medium, such as storage device 250, or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

As particularly shown in FIG. 2, processing unit 220 may particularly execute instructions stored in main memory 230, such as instructions that implement DSL test tool 232. DSL test tool 232 may provide a testing service that can be accessed from customer premises 130 to test a DSL line. In general, DSL test tool 232 may control and receive test results back from TU 126/146. DSL test tool 232 may further provide the test results to the technician installing or performing maintenance on the DSL line. DSL test tool 232 will be described in more detail below.

Figure 3:
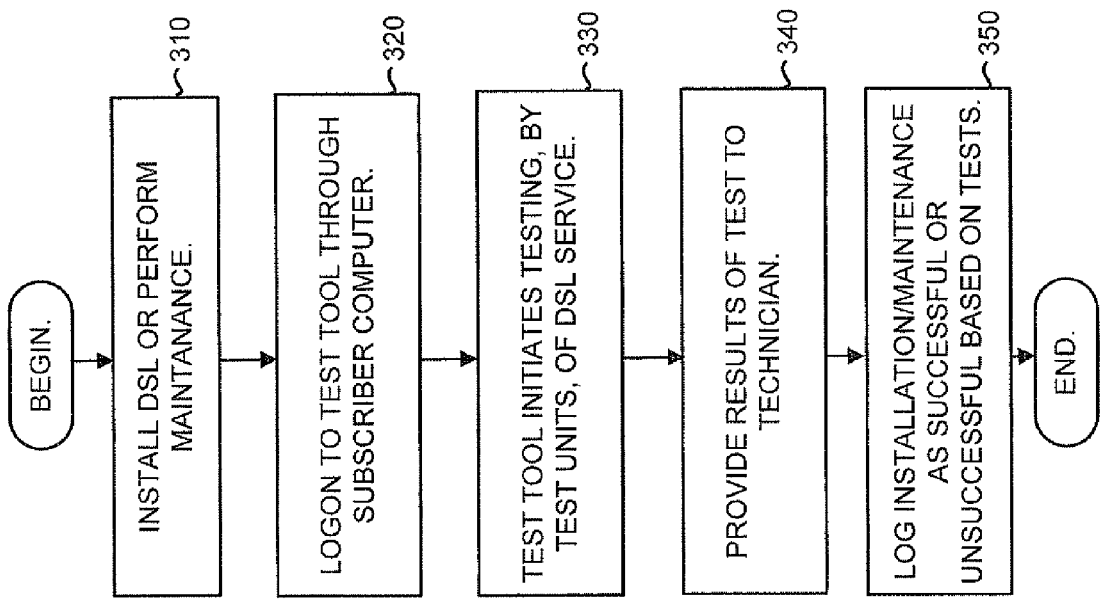
FIG. 3 is a flow chart illustrating exemplary operations that may be performed when installing or performing maintenance on a DSL line.

FIG. 3 is a flow chart illustrating exemplary operations that may be performed when installing or performing maintenance on a DSL line.

A technician for the DSL service provider may, at the customer premise, install a DSL line or perform maintenance on a previously installed line (block 310). After installing or performing maintenance, the technician may need to test the DSL service.

To test the DSL service, the technician may logon to test tool 232 through a subscriber computer (block 320). When possible, the technician may particularly logon to test tool 232 using a computer at subscriber premise 130-1. As opposed to the technician accessing test tool 232 through a laptop or other device carried by the technician, using the subscriber's computer may provide an extra measure of assurance that the subscriber's computer is able to access the DSL service. Test tool 232 may provide an interface through a standard Internet browser of the subscriber's computer. In this manner, software may not need to be installed on the subscriber's computer.

Test tool 232 may initiate testing of the subscriber's DSL service using TU 126 and/or 146 (block 330). As previously mentioned, TUs 126/146 may perform test functions that relate to the determination of the quality of the DSL service, such as information relating to the maximum upstream or downstream bit rate, determination of the maximum or average line capacity, determination of the line error rate, and/or determination of the noise on the line. In addition to performing tests relating to the physical characteristics of the DSL line (i.e., the physical and data-link layers), test tool 232 may perform other testing functions covering other aspects of the DSL service, such as verifying that the network connection to the server that hosts test tool 232 is being implemented by the DSL service being tested. In general, the testing performed by test tool 232 and TUs 126/146 may include tests of the network connection at both the physical and logical layers of the network connection, possibly including tests relating to all seven layers of the Open Systems Interconnection (OSI) seven layer model. These seven layers may include: the application layer, the presentation layer, the session layer, the transport layer, the network layer, the data-link layer, and the physical layer(s).

Test tool 232 may next provide the results of the DSL test to the technician at the subscriber premise (block 340). The results may be provided through a browser-based web interface. With such an interface, the technician may run the test directly from a subscriber computing device without needing to install new software. The technician may interact with the interface provided by test tool 232 to, for example, perform further tests, receive additional diagnostic information, or to finalize and log the provisioning/maintenance request as having been completed.

Based on the results of the test performed by test tool 232, test tool 232 may eventually log the result of the installation or maintenance of the DSL line as successful or unsuccessful (block 350). For instance, the technician may verify that an installation is complete. In response to the technician's verification and in response to a successful test result, test tool 232 may log the installation/maintenance as successful.

Figure 4:
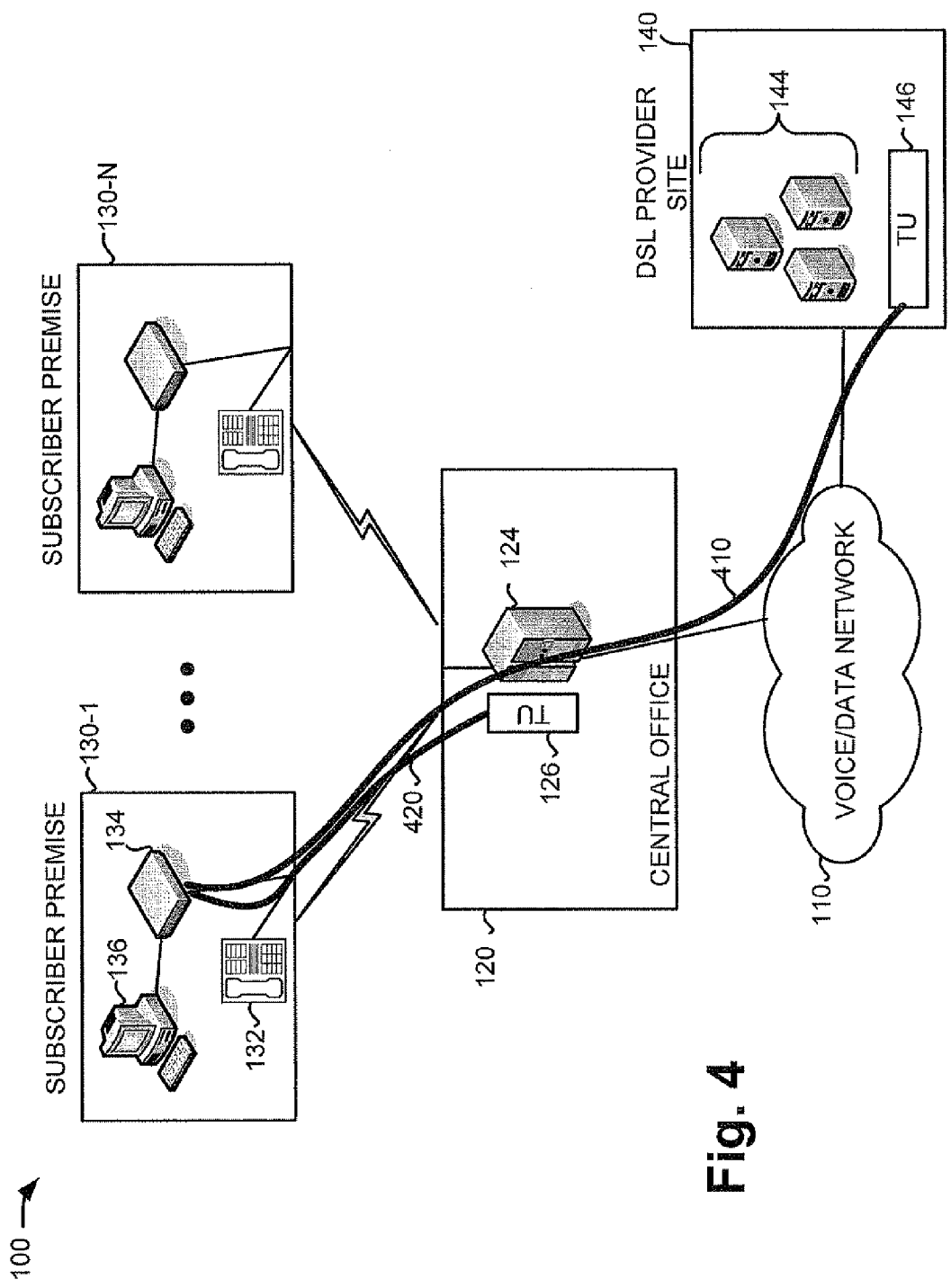
FIG. 4 is a diagram illustrating exemplary operation of the test tool shown in FIG. 1.

FIG. 4 is a diagram illustrating exemplary operation of test tool 232 in environment 100 shown in FIG. 1. In this example, assume that test tool 232 is executed by one of servers 144, that a DSL service at subscriber premise 130-1 is being tested, and that TU 126 is used to perform the testing of a DSL line. After installing the DSL service, the technician may connect, using the DSL service, to test tool 232, illustrated as connection 410. Test tool 232 may initiate testing of the DSL line to customer premise 130-1 by, for example, signaling test unit 126 to perform the test. The test by TU 126 is illustrated as connection 420. TU 126 may transmit the result of the test back to test tool 232. Test tool 232 may inform the technician of the results, and based on the results, may take other actions, such as logging the provisioning or repair of the line as successful.

The operation of test tool 232 will be discussed in more detail below with reference to the flow chart of FIG. 5 and the exemplary user interface screen diagrams of FIGS. 6A through 6D.

Figure 5:
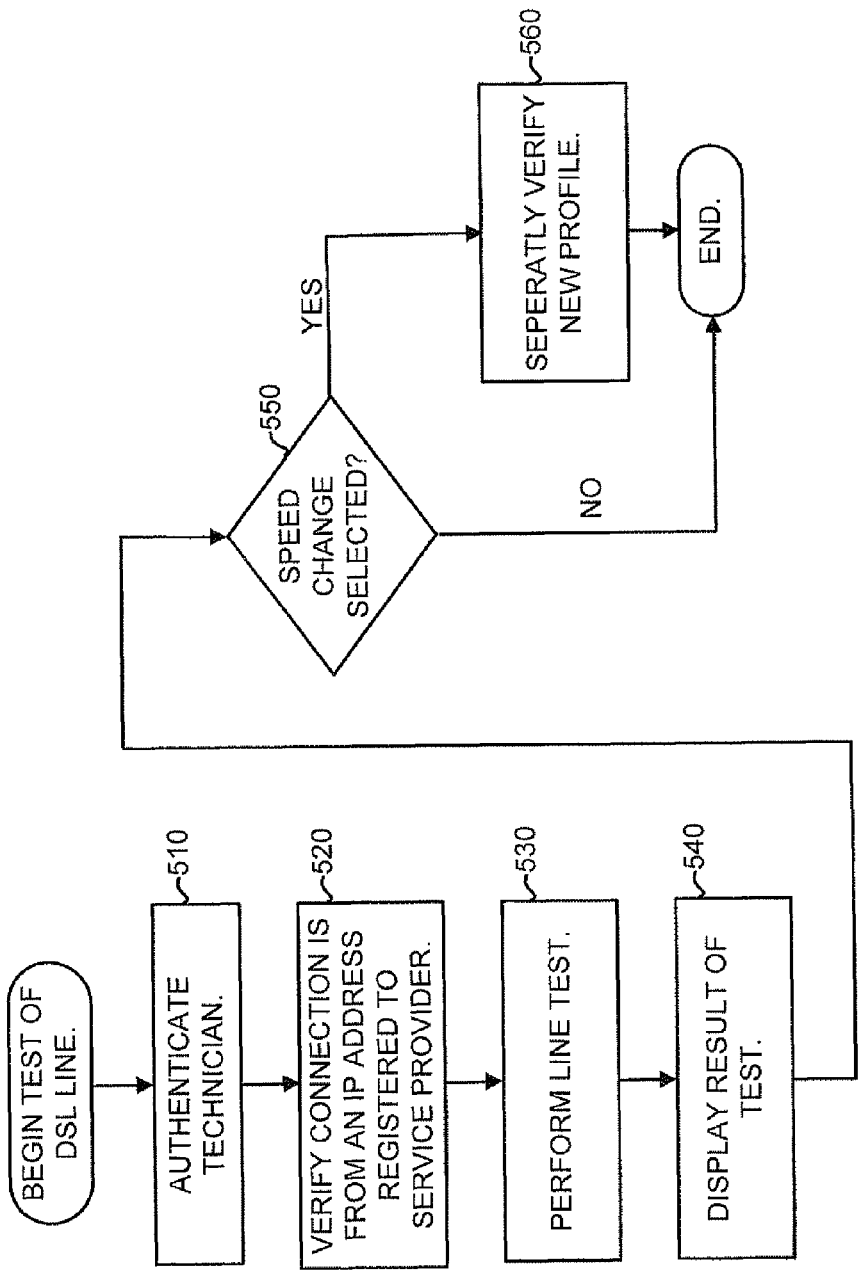
FIG. 5 is a flow chart of exemplary operations performed by the test tool in response to a test request from a technician.

FIG. 5 is a flow chart of exemplary operations performed by test tool 232 in response to a test request from a technician.

To begin, a technician may initiate a session with test tool 232 by, for example, navigating a web browser, running on a computer at subscriber premise 130-1, to a Uniform Resource Locator (URL) (i.e., a web address) associated with test tool 232. As previously mentioned, test tool 232 may be implemented as, for example, a web application implemented by one or more servers 144. The URL may correspond to the address of the one or more server devices that implement test tool 232.

In response to the initiation of a test session, test tool 232 may initially authenticate the technician (block 510). For example, test tool 232 may require that the technician enter a user name (or other user identification) and passphase (or password). In some implementations, the passphrase may be based on a two-factor authentication system in which the passphrase includes, for example, a component known by the technician and a component generated by a hardware device carried by the technician. The technician may also enter the phone number of the DSL line that is being provisioned or repaired.

Figure 6B:
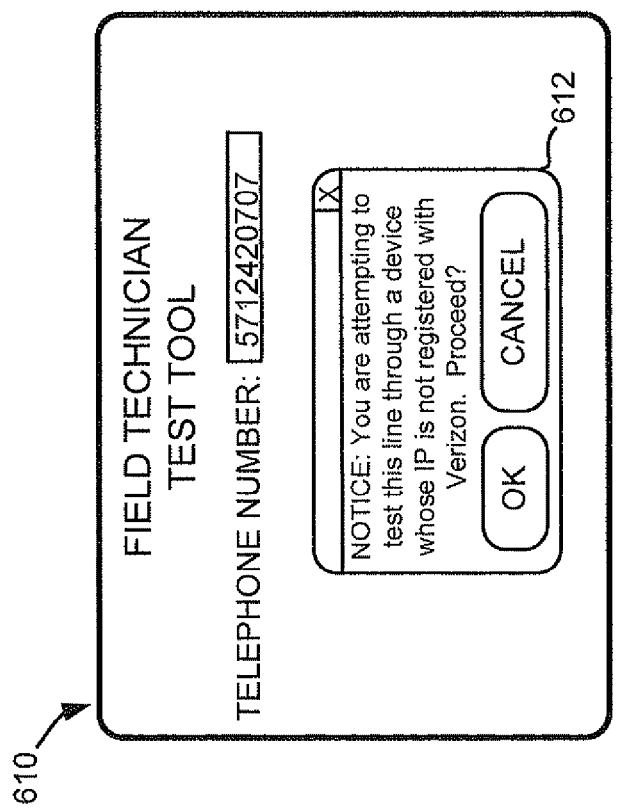
Figure 6A:
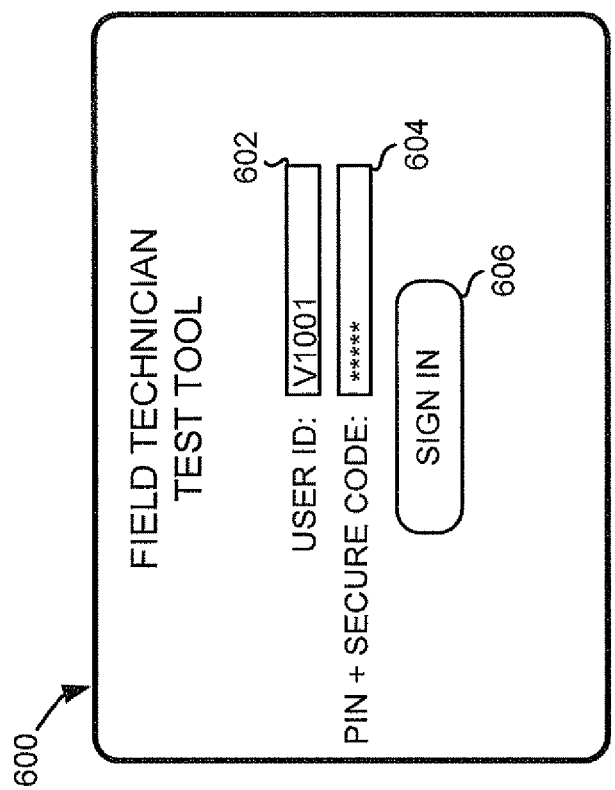

FIG. 6A is a diagram of an exemplary graphical user interface 600 that may be presented to the technician during authentication. As shown, graphical interface 600 may include a field 602 in which technician may enter an assigned user name (or identification), a field 604 in which the technician may enter a passphrase, and a button 606 to submit the authentication information to test tool 232. As previously mentioned, the passphrase entered in field 604 may include, in some implementations, a multi-factor passphrase.

Returning to FIG. 5, test tool 232 may next verify that the Internet Protocol (IP) address associated with the subscriber premise is one that is associated with the DSL provider (block 520). It may be possible that the network connection that is being used to access test tool 232 from subscriber premise 130-1 is actually a connection other than that provided by the DSL service being provisioned or repaired. For example, the network connection may be a wireless connection inadvertently picked-up from a neighbor's residence. To guard against this, test tool 232 may notify the technician if the IP address associated with the connection to test tool 232 is not one that is registered to the DSL provider.

FIG. 6B is a diagram of an exemplary graphical user interface 610 that may be presented to the technician during verification of the subscriber's IP address. As shown, graphical interface 610 may display a pop-up window 612 that informs the technician when IP address that is being used to access test tool 232 is an IP address that is not associated with the DSL provider. In response, the technician may decide to stop the test and determine why the subscriber is not connecting through an IP addresses associated with the DSL provider.

As further shown in FIG. 5, test tool 232 may perform the test of the DSL line using one or more of TUs 126/146 (block 530). As discussed with respect to block 330 (FIG. 3), this test may test the line being provisioned at both the physical and logical network layers connection, potentially including tests relating to all seven layers of the Open Systems Interconnection (OSI) seven layer model.

Test tool 232 may display the results of the test (block 540). The results may be provided through the browser-based web interface. The results may include an indication of whether the line passed or failed the test, detailed information about the test, or other information. In displaying the results, test tool 232 may also provide the technician with other options to adjust the line settings.

Figure 6C:

FIG. 6C is a diagram of an exemplary graphical user interface 620 that may be presented to the technician when displaying results of the line test. Graphical interface 620 may include a number of fields showing basic information about the line test, results of the line test, and options to perform other actions or view more information about the line test. As shown, graphical interface 620 may include a field 622 displaying the telephone number corresponding to the line that was tested and a summary result section 624 that displays high-level results of the test, such as whether the test was a success or failure, the time of the test (e.g., when the test was submitted and completed), and a confirmation number corresponding to the test. Graphical interface 620 may further include a section 626 that confirms the entity to which the tested IP address is registered. Further, graphical interface 620 may include a section 628 that provides additional information about the test, such as a test result, a test code, and summary information about the test. In this example, the summary information in section 628 may help the technician quickly understand the test results by providing a possible explanation as to why one portion of the test failed. In this example, the summary information states that the "layer 3 ICMP ping" failed and the reason for the failure is that the subscriber is likely using a firewall. Section 628 may also include an icon 630 that the technician may select to display further details about the test. For example, in response to the selection of icon 630, a complete set of test results may be displayed.

Graphical user interface 620 may also allow the technician to perform additional actions. For example, as shown, graphical user interface 620 may include a "submit for testing" button 635 and a "speed change" button 640. Submit for testing button 635 may submit (or re-submit) the line identified by the telephone number in field 622 for testing. The technician may wish, for example, to re-try a test after, in response to an initial test, modifying the line configuration in some way.

Speed change button 640 may initiate an adjustment of the line profile to potentially optimize the speed of the DSL service. The technician may implement this test if, for example, the technician believes the performance of the DSL line is not adequate.

Referring back to FIG. 5, the technician may initiate a speed change procedure (block 550). The speed change procedure may be initiated by, for example, selecting speed change button 640. This procedure may be desirable when, for example, the DSL service appears unstable at the configured speed.

In response to a speed change request, test tool 232 may adjust a profile of the DSL line and then test the line with the adjusted profile. A number of different profiles may be attempted. Profiles that are determined to be stable, based on the testing, may be candidates to implement permanently on the line. In one implementation, the subscriber's speed profile may be adjusted downwards until an optimal or stable setting is found.

FIG. 6D is a diagram of an exemplary graphical user interface 650 that may be presented to the technician when adjusting a subscriber's speed profile. Graphical interface 650 may include a number of fields showing basic information about the speed test. As shown, graphical interface 650 may include a section 652 that displays information about the test and a result section 654 that displays the result of the test. As shown, section 652 may include fields that provide an identification number for the test, the test type ("SPEED_DOWN-GRADE") and the date and time of the test. Section 654 may display the result of the test, such as the new, downgraded speed of the line.

In one possible implementation, the speed profile resulting from a speed test may initially only be temporary. As shown in graphical interface 650, for example, a message 656 may be displayed to remind the technician that the speed profile will revert back to the provisioned profile within a certain time period. As further shown in FIG. 5, in order to make the adjusted profile permanent, the technician or the subscriber may be required to separately verify that the speed profile is to be changed (block 560), such as by independently calling the DSL provider.

The above description of test tool 232 was primarily described in the context of testing a DSL line. In some implementations, concepts consistent with those described herein may be applied to other broadband or IP based technologies. For example, broadband service may be provided to subscribers through fiber optic or broadband cable connections to the subscriber premise. Test units similar to TUs 126/146 may be similarly used, in conjunction with test tool 232, to provide testing of these broadband services over, potentially, all seven layers of the OSI seven layer network model.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with regard to FIGS. 3 and 5, the order of the blocks may be modified in other implementations. Further, non-dependent blocks may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions of the invention may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "tone" or similar language is used. Further, the phrase "based on" is intended to mean "based, at least in part, on" unless explicitly stated otherwise.

What is claimed is:

1. A method, comprising:
receiving, by a first device and from a second device located at a subscriber premise, a request to test a Digital Subscriber Line (DSL) service provided at the subscriber premise as part of installation or repair of the DSL service, the second device being different from the first device;
initiating, by the first device, a test of the DSL service using test equipment located externally to the subscriber premise, the test including tests relating to a physical layer of the DSL service;
transmitting, by the first device, results of the test to the second device;
receiving, by the first device and from the second device, a request to modify a profile of the DSL service based on transmitting the results;
modifying, by the first device and based on receiving the request, the profile of the DSL service to form a modified profile;
initiating, by the first device, another test of the DSL service using the test equipment based on the modified profile;
transmitting, by the first device, other results of the other test to the second device; and logging, by the first device, the installation or the repair of the DSL service as one of successful or unsuccessful based on transmitting the other results of the other test.

2. The method of claim 1, where the test of the DSL service includes test functions relating to all seven layers of an Open Systems Interconnection (OSI) seven layer network model associated with the DSL service.

3. The method of claim 1, further comprising:
determining, before initiating the test of the DSL service, whether an Internet Protocol (IP) address, of the subscriber premise from which the request is received, is an IP address that is associated with a service provider of the DSL service; and
providing, via a graphical interface displayed by the second device located at the subscriber premise, information indicating that the IP address is not associated with the service provider of the DSL service when the request is not be received from the IP address, the test of the DSL service being initiated when the request is received from the IP address.

4. The method of claim 1, where the request to test the DSL service is initiated by a user associated with a service provider of the DSL, the method further including:
providing, via a uniform resource locator (URL) associated with the first device, a web application for initiating the test of the DSL service; and
authenticating, via the web application, the user before initiating the test of the DSL service.

5. The method of claim 4, where the second device is a computing device of the subscriber, and
where the user accesses the web application using the computing device without installing a program, associated with the web application, on the computing device.

6. The method of claim 4, further comprising:
transmitting the results of the test and the other results of the other test as a web document, to the second device, via the web application.

7. The method of claim 1, where the test of the DSL service and the other test of the DSL service include one or more tests that:
measure a maximum upstream bit rate of the DSL service,
measure a downstream bit rate of the DSL service,
determine a maximum capacity of the DSL service,
determine an average capacity of the DSL service, or
measure noise on a line associated with the DSL service.

8. The method of claim 1, where the request comprises a request to adjust a speed of the DSL service;
where modifying the profile of the DSL service includes:
modifying the profile of the DSL service to adjust the speed of the DSL service; and
where the method further comprises:
testing the modified profile in response to initiating the other test of the DSL service;
determining whether a verification of the modified profile of the DSL service is received within a particular period of time from transmitting the other results of the other test; and
modifying the modified profile of the DSL service to obtain the profile of the DSL service when the verification of the modified profile of the DSL service is not received within the particular period of time.

9. The method of claim 8, further comprising:
repeating the modification of the profile of the DSL service and the testing of the modified profile to decrease the speed of the DSL service;
determining a plurality of modified profiles to obtain a plurality of profile settings for the DSL service based on repeating the modification of the profile of the DSL service and the testing of the modified profile, where the other results, of the other test, include information identifying the determined plurality of modified profiles.

10. The method of claim 1, where at least a portion of the test equipment is located at a central office of a telecommunication provider.

11. A system comprising:
test equipment to test telephone lines associated with a subscriber premises that subscribe to Digital Subscriber Line (DSL) services, the test equipment being located externally to the subscriber premises;
one or more computing devices to:
provide a web interface for a test application to a particular subscriber premise, of the subscriber premises, via the web interface, using a DSL service of a subscriber,
receive, from a computing device located at the particular subscriber premise, a request to test the DSL service at the particular subscriber premise,
control, in response to the request, the test equipment to perform a first test of a particular telephone line, of the telephone lines, associated with the DSL service,
transmit first results of the first test to the particular subscriber premise using the web interface,
receive, via the web interface, a request to modify a profile associated with the DSL service based on transmitting the first results,
modify the profile to form a modified profile based on the request to modify the profile,
control the test equipment to perform a second test of the particular telephone line based on the modified profile,
transmit second results of the second test to the particular subscriber premise using the web interface, and
store information indicating that the second test was successful based on transmitting the second results of the second test.

12. The system of claim 11, where the request to test the DSL service is received as part of an installation of the DSL service at the particular subscriber premise.

13. The system of claim 11, where at least one of the first test or the second test includes tests relating to a physical layer of the DSL service of the subscriber.

14. The system of claim 11, where at least one of the first test or the second test includes tests relating to all seven layers of an Open Systems Interconnection (OSI) seven layer network model associated with the DSL service.

15. The system of claim 11, where the one or more computing devices are further to:
verify, before controlling the test equipment to test the particular telephone line associated with the DSL service, that an Internet Protocol (IP) address of the particular subscriber premise, from which the request is received, is an IP address that is associated with a service provider of the DSL, and
provide, via the web interface, information indicating whether the IP address of the particular subscriber premise is the IP address that is associated with the service provider of the DSL based on the verification.

16. The system of claim 11, where the request to test the DSL service is initiated by a user associated with a service provider of the DSL, and
where the one or more computing devices are further to:
authenticate the user before controlling the test equipment to test the particular telephone line.

17. The system of claim 11, where the one or more computing devices are further to:
   transmit the first results of the first test as a web document to the computing device located at the particular subscriber premise.

18. The system of claim 11, where the first test of the particular telephone line include one or more tests that:
   measure a maximum upstream bit rate of the particular telephone line,
   measure a downstream bit rate of the particular telephone line,
   determine a maximum capacity of the particular telephone line
   determine an average capacity of the particular telephone line, or
   measure noise on the particular telephone line.

19. The system of claim 11, where, when modifying the profile, the one or more computing devices are to:
   modify the profile of the DSL service to decrease a speed of the DSL service.

20. The system of claim 19, where the one or more computing devices are further to:
   repeat the modification of the profile of the DSL service to form a plurality of modified profiles,
   control the test equipment to perform the second test based on the plurality of modified profiles, and
   determine one or more profiles, of the plurality of modified profiles, for the DSL service based on the second results.

21. The system of claim 11, where at least some of the test equipment is located at a central office of a telecommunication provider.

22. A device, comprising:
   a memory to store one or more instructions; and
   a processor to execute the one or more instructions to:
      receive, from a computing device located at a subscriber premise, a request to test a broadband service at the subscriber premise as part of an installation of the broadband service at the subscriber premise;
      initiate a first test of the broadband service using test equipment located externally to the subscriber premise at which the broadband service is provided, the first test including tests relating to all seven layers of an Open Systems Interconnection (OSI) seven layer network model associated with the broadband service;
      transmit first results of the first test to the computing device located at the subscriber premise;
      receive, from the computing device, a request to modify a profile associated with the broadband service based on transmitting the first results,
      modify the profile to form a modified profile based on the request to modify the profile,
      control the test equipment to perform a second test of the broadband service based on the modified profile,
      transmit second results of the second test to the computing device,
      store information related to the installation of the broadband service, the information related to the installation of the broadband service indicating that the installation is successful or unsuccessful based on the results of the second test.

23. The device of claim 22, where the broadband service includes a Digital Subscriber Line (DSL) broadband service.

24. The device of claim 23, where the test of the DSL service includes tests that:
   measure a maximum upstream bit rate of the DSL service,
   measure a downstream bit rate of the DSL service,
   determine a maximum capacity of the DSL service,
   determine an average capacity of the DSL service, or
   measure noise on a line associated with the DSL service.

* * * * *